(12) United States Patent
Richer De Forges et al.

(10) Patent No.: US 7,506,896 B2
(45) Date of Patent: Mar. 24, 2009

(54) FLEXIBLE JOINT WITH BELLOWS

(75) Inventors: Hervé Richer De Forges, Montargis (FR); Jean-Pierre Ciolczyk, Montargis (FR)

(73) Assignee: Hutchinson (FR)

(*) Notice: Subject to any disclaimer, the term of this patent is extended or adjusted under 35 U.S.C. 154(b) by 0 days.

(21) Appl. No.: 11/948,183

(22) Filed: Nov. 30, 2007

(65) Prior Publication Data
US 2008/0139322 A1 Jun. 12, 2008

(30) Foreign Application Priority Data
Dec. 7, 2006 (FR) .................................. 06 10668

(51) Int. Cl.
*F16L 27/04* (2006.01)
(52) U.S. Cl. .................. 285/226; 285/225; 285/263
(58) Field of Classification Search ................ 285/268, 285/226, 263, 225
See application file for complete search history.

(56) References Cited

U.S. PATENT DOCUMENTS

| 3,811,713 | A | * | 5/1974 | Barrett et al. ................ 285/226 |
| 4,068,868 | A | * | 1/1978 | Ohrt ............................ 285/263 |
| 4,183,556 | A | * | 1/1980 | Schwemmer ................. 285/51 |
| 4,416,473 | A | * | 11/1983 | Lamy et al. .................. 285/41 |
| 4,706,998 | A | * | 11/1987 | Peppel et al. ............. 285/146.3 |
| 4,846,509 | A | * | 7/1989 | Moore ......................... 285/225 |
| 4,881,759 | A | * | 11/1989 | Kovitch et al. ................ 285/49 |
| 5,133,578 | A |   | 7/1992 | Whightsil, Sr. |
| 5,951,061 | A |   | 9/1999 | Arlt, III |
| 7,341,283 | B2 | * | 3/2008 | Moses et al. ................ 285/226 |

FOREIGN PATENT DOCUMENTS

FR 2 471 544 A1 6/1981
GB 2 190 970 A 12/1987

OTHER PUBLICATIONS

Search Report from corresponding French Application No. 06/10668, filed Dec. 7, 2006.

* cited by examiner

*Primary Examiner*—David E Bochna
(74) *Attorney, Agent, or Firm*—Alston & Bird LLP

(57) ABSTRACT

A flexible joint with bellows for coupling two tubular elements together for passing fluid in a flow space and presenting a main axis that is constituted by the axis common to the tubular elements when they are in their aligned position, and including at least one flexible joint element functionally connected to a first tubular element and to a casing, together with a coupling bellows coupling together the two tubular elements, the coupling bellows, the flexible joint element, and the casing defining walls of a fluid-filled cavity. The joint including a flexible pressure-compensation device spaced apart from the bellows and having a first face forming at least part of a wall of said cavity and a second face that is in communication with the flow space.

9 Claims, 2 Drawing Sheets

FLEXIBLE JOINT WITH BELLOWS

CROSS REFERENCE TO RELATED APPLICATIONS

This application claims priority from French patent application 06/10668 filed Dec. 7, 2006.

The present invention relates to a flexible joint with bellows suitable for constituting a flexible hinge between two tubular elements, in particular in undersea oil installations, and more particularly in installations subjected to high pressures and/or to large variations in internal pressure.

BACKGROUND OF THE INVENTION

Flexible joints make use of at least one flexible joint element, in particular a laminated joint, e.g. a ball joint made up of alternating layers of metal and of rubber.

The combination of large variations in pressure together with the action of gas dissolved in the fluid being conveyed leads to problems of bubbles of gas absorbed within the rubber decompressing rapidly.

U.S. Pat. No. 5,133,578 relates to a ball joint between two moving tubes (a so-called "floating" connection) using two symmetrical laminated ball joints and a central compensation system. In its FIG. 2, provision is made to protect the laminated joint by means of a metal bellows that transmits the outside pressure by varying in diameter, the bellows being in hydrostatic equilibrium. That bellows must therefore perform two functions simultaneously: it must track the movement of the laminated joint and it must also transmit pressure.

Such a bellows presents two main drawbacks, namely relative fragility and difficulty of fabrication because of its complex shape and its small thickness.

As an alternative, the above-mentioned patent proposes compensating pressure with the help of an accumulator (FIG. 4) or else of a piston housed in the central portion of the bellows (FIG. 5). Neither of those solutions is satisfactory. Using an external accumulator associated with a leaktight high pressure connection raises problems of reliability in an undersea application, while implementing a piston complicates both structure and assembly and requires two bellows to be present with leaktight anchoring.

OBJECTS AND SUMMARY OF THE INVENTION

The present invention seeks to propose an improved solution that enables the laminated joint to be protected while allowing the laminated joint to move, by separating the two functions of guiding the laminated joint and of transmitting pressure.

The invention thus provides a flexible joint with bellows for coupling together two tubular elements for passing a fluid in a flow space and presenting a main axis that is an axis common to the two tubular elements when in their aligned position, and including at least one flexible joint element functionally connected to the first tubular element and to a casing, together with a coupling bellows coupling together the two tubular elements, the coupling bellows, the flexible joint element, and the casing defining walls of a fluid-filled cavity, the joint including a flexible pressure-compensation device that is spaced apart from the bellows and that has a first face forming at least a portion of a wall of said cavity and a second face that is in communication with the fluid flow space.

Thus, the movements in rotation and/or translation of the laminated joints are tracked by a bellows that may be of constant diameter, while pressure compensation is provided by a device that is placed axially, and that is provided with a degree of freedom in the axial direction.

For a given diameter, the flexible joint as defined above makes it possible to save a considerable amount of height, e.g. 30%. This makes it possible in particular to reduce the height of the casing body, which is difficult to make because of the pressure it needs to accommodate.

The flexible pressure-compensation element may be made in the form of an annular diaphragm or else by one or more corrugated bellows or in the form of a diaphragm presenting a closure at one end. The or each compensation bellows is/are advantageously housed in an annular region about an axis constituted by said main axis. The variant with a diaphragm bellows makes it possible to compensate pressure variations more precisely and more quickly because of lower stiffness, and also to compensate a larger volume of fluid.

In a variant, the casing comprises a body together with a cover situated axially remote from the flexible joint portion.

The coupling bellows may then be housed between the first tubular element and an element that is stationary relative to the casing cover, while the flexible pressure-compensation element is housed between the inside of said element that is stationary relative to the casing cover and the outside of the casing body, the casing cover including at least one opening putting the second face of the compensation flexible element into communication with the flow space.

In order to avoid the bottom tube rising and thereby damaging the laminated ball joint, the casing cover is advantageously coupled to a cylindrical extension disposed in the flow space and housing the coupling bellows, at least in part. This cylindrical extension also makes it possible to avoid problems of turbulence due to the stream of liquid passing close to the undulations of the bellows (vibrations of the bellows).

BRIEF DESCRIPTION OF THE DRAWINGS

Other characteristics and advantages of the invention appear better on reading the following description with reference to the following drawings in which.

MORE DETAILED DESCRIPTION

Figure 1A:
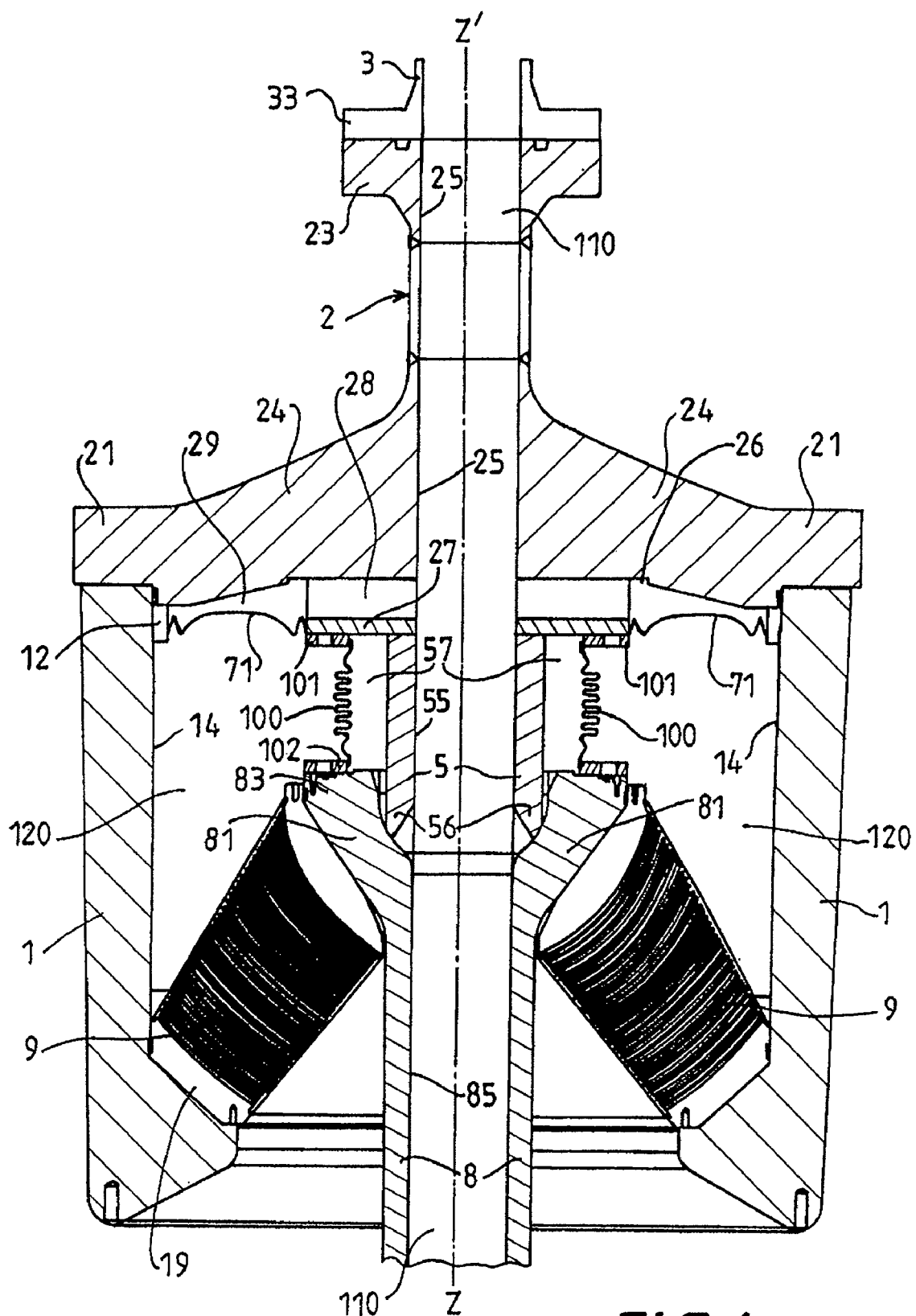
FIGS. 1a and 1b are section views showing two variants of the invention.

The flexible joint shown seeks to provide a connection between two tubes 3 and 8 for transferring fluid under high pressure in an undersea oil installation.

One of the tubes, referenced 3, presents a flange 33 mounted on a flange 23 of a cover 2 of a casing that presents a casing body 1. The cover 2 presents an enlarged base 24 enabling it to be mounted by tie bars on the body 1 of the casing, while defining in particular a main chamber 120 filled with an incompressible fluid.

At its bottom end, the body 1 receives on its circular concave periphery 19 a laminated ball joint 9 constituted in known manner by alternating layers of metal and layers of elastomer that are bonded together. The laminated ball joint 9 is secured to the periphery 19, and at its other end that is in the form of a circular arc in section, it is secured to a flared extension 81 of the tube 8.

The end 83 of the extension 81 receives a seal-maintaining element 102 at the end of a corrugated metal bellows 100 for compensating pressure having thickness of about 0.5 mm and having an axis that is constituted by the axis ZZ' common to the two pipes 3 and 8 when they are in their aligned position.

The inside face 14 of the casing body 1, the laminated joint 9, and the outside face of the bellows 100 define a cavity 120 that is filled with a liquid, e.g. a silicone oil, and in which the top portion (top in the position shown in the drawing), i.e. the portion axially remote from the laminated joint 9, is closed by a flexible device 7 for compensating volume.

Figure 1B:
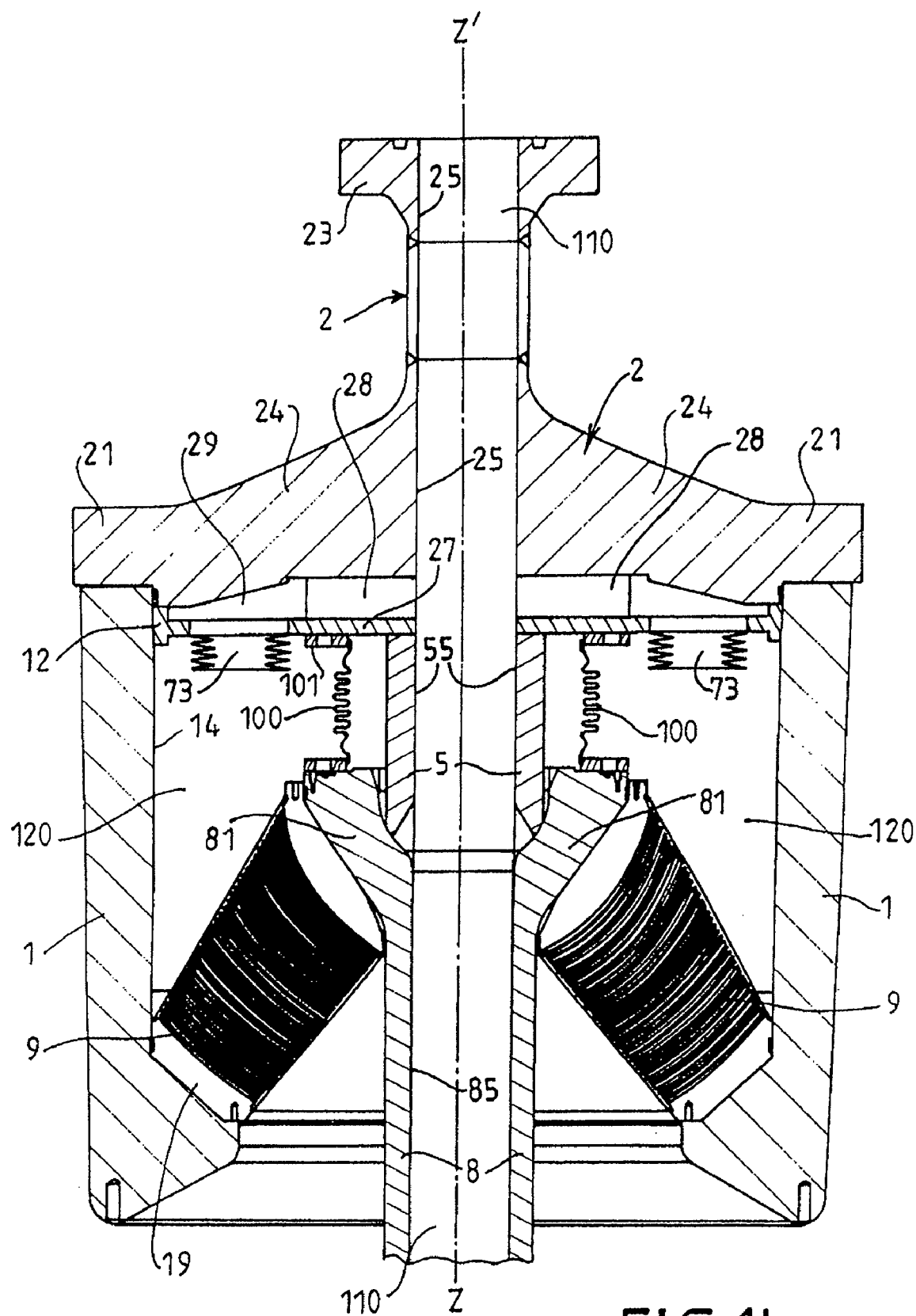

The volume-compensating device is implemented by an annular metal diaphragm 71 (FIG. 1*a*) or else by one or more corrugated bellows 73 (FIG. 1*b*). These corrugated bellows 73 may be independent, as shown, or they may be integrated in an annulus.

The top portion of the bellows 100 (top in the drawing) is held in sealed manner by an element 101 that is carried by a collar 27 that holds the inner periphery of the diaphragm 71 forming the compensation bellows.

An annular support element 12 holds the outer periphery of the diaphragm 17 in sealed manner.

The bellows 100 and the flexible device 7 are mounted on a tubular fitting 5 surmounted by the collar 27 and received in an annular groove 26 of the casing cover 2. A secondary cavity 29 surmounts the flexible device 7 and communicates via one or more openings 28 of the collar 27 with the main fluid flow channel 110 defined by the inside face 55 of the tubular fitting 5, the inside face 25 of the cover 2, and the inside face 85 of the tube 8.

The fitting 5 is generally cylindrical and coaxial inside the bellows 100 so as to avoid the bottom tube 8 rising and as a result damaging the ball joint 9, and so as to protect the bellows against problems associated with turbulence in the fluids passing through the pipes 8 and 3, e.g. rising upwards in the drawing.

The bottom end 56 of the fitting 5 is frustoconical and bears against the flared extension 81. During assembly, the fitting 5 is thus held between the collar and the extension 81. Between the outside face 84 of the fitting 5 and the inside periphery of the bellows there exists an annular chamber 57 which is at the same pressure as the main fluid flow channel 110.

On being put into operation, the height of the laminated joint 9 decreases to provide sufficient play for balancing pressures.

Because the compensation liquid presents a certain amount of compressibility, the volume that is to be occupied by the flexible compensation element 7 is directly associated with the volume of fluid in the chamber 120. To reduce this volume, it is possible to fill the chamber 120 in part with a solid material that is incompressible (mineral or metal).

What is claimed is:

1. A flexible joint with bellows for coupling together two tubular elements for passing a fluid in a flow space and presenting a main axis that is an axis common to the two tubular elements when in their aligned position, and including at least one flexible joint element functionally connected to the first tubular element and to a casing, together with a coupling bellows coupling together the two tubular elements, the coupling bellows, the flexible joint element, and the casing defining walls of a fluid-filled cavity, the joint including a flexible pressure-compensation device that is spaced apart from the bellows and that has a first face forming at least a portion of a wall of said cavity and a second face that is in communication with the fluid flow space.

2. A flexible joint according to claim 1, wherein the flexible pressure-compensation element is an annular diaphragm having said main axis as its own axis.

3. A flexible joint according to claim 1, wherein the flexible pressure-compensation element is constituted by at least one compensation bellows.

4. A flexible joint according to claim 3, wherein at least one compensation bellows is housed in an annular region having said main axis as its own axis.

5. A flexible joint according to claim 1, wherein the casing comprises a body together with a cover situated axially remote from the flexible joint portion.

6. A flexible joint according to claim 5, wherein the coupling bellows is housed between the first tubular element and an element that is stationary relative to the casing cover, the flexible pressure-compensation element is housed between said element that is stationary relative to the casing cover and the casing body, and said element that is stationary including at least one opening putting the second face of the flexible compensation element into communication with the flow space.

7. A flexible joint according to claim 5, wherein the casing cover is coupled to a cylindrical extension disposed in the flow space and housed within the coupling bellows, at least in part.

8. A flexible joint according to claim 7, wherein the cylindrical extension includes at least one said opening putting the second face of the flexible compensation element into communication with the flow space.

9. A flexible joint according to claim 1, wherein said cavity is filled in part with a solid material.

* * * * *